(12) United States Patent
Huh et al.

(10) Patent No.: US 10,717,430 B2
(45) Date of Patent: Jul. 21, 2020

(54) SPATIAL DIVISION TYPE STOP CONTROL METHOD AND VEHICLE USING THE SAME

(71) Applicants: Hyundai Motor Company, Seoul (KR); Kia Motors Corporation, Seoul (KR)

(72) Inventors: Jee-Wook Huh, Gyeonggi-do (KR); Dong-Jin Sohn, Gyeonggi-do (KR); Chun-Hyuk Lee, Gyeonggi-do (KR); Kyoung-Choel Oh, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 145 days.

(21) Appl. No.: 15/858,877

(22) Filed: Dec. 29, 2017

(65) Prior Publication Data

US 2019/0092315 A1 Mar. 28, 2019

(30) Foreign Application Priority Data

Sep. 26, 2017 (KR) .......................... 10-2017-0123930

(51) Int. Cl.
*B60W 20/40* (2016.01)
*B60L 15/20* (2006.01)
(Continued)

(52) U.S. Cl.
CPC .............. *B60W 20/40* (2013.01); *B60L 1/02* (2013.01); *B60L 3/0023* (2013.01); *B60L 15/20* (2013.01); *B60L 50/16* (2019.02); *B60L 58/13* (2019.02); *B60L 58/21* (2019.02); *B60W 20/11* (2016.01); *B60W 30/181* (2013.01);
(Continued)

(58) Field of Classification Search
CPC .... B60W 20/40; B60W 20/11; B60W 30/181; B60W 30/182; B60W 2550/402; B60L 58/13; B60L 15/20; B60L 2240/34; B60L 2240/622; B60L 2270/142
See application file for complete search history.

(56) References Cited

U.S. PATENT DOCUMENTS 6,314,352 B1 * 11/2001 Kunimatsu ............ G01C 21/26
340/996
6,832,148 B1 * 12/2004 Bennett .................. B60K 6/445
701/54
(Continued)

FOREIGN PATENT DOCUMENTS

KR 10-0746746 B1 8/2007
KR 10-0871253 B1 11/2008
(Continued)

*Primary Examiner* — Sze-Hon Kong
(74) *Attorney, Agent, or Firm* — Mintz Levin Cohn Ferris Glovsky and Popeo, P.C.; Peter F. Corless

(57) ABSTRACT

A method of controlling vehicle stopping is provided. The method includes dividing an open space from a closed space, in which a gate is connected to the ground, to apply an open space stop control mode to the open space and to apply a closed space stop control mode to the closed space. Additionally, spatial division stop control is performed in which a control condition for each of an engine power, a vehicle interior temperature, and a battery state of charge (SOC) is varied between the open space stop control mode and the closed space stop control mode when a vehicle enters the closed space.

16 Claims, 6 Drawing Sheets

(51) Int. Cl.
  *B60W 30/18* (2012.01)
  *B60W 20/11* (2016.01)
  *B60W 30/182* (2020.01)
  *B60L 58/13* (2019.01)
  *B60L 58/21* (2019.01)
  *B60L 50/16* (2019.01)
  *B60L 1/02* (2006.01)
  *B60L 3/00* (2019.01)

(52) U.S. Cl.
  CPC ........ *B60W 30/182* (2013.01); *B60L 2240/34* (2013.01); *B60L 2240/622* (2013.01); *B60L 2250/16* (2013.01); *B60L 2260/22* (2013.01); *B60L 2270/142* (2013.01); *B60W 2556/50* (2020.02)

(56) References Cited

U.S. PATENT DOCUMENTS

| | | | | |
|---|---|---|---|---|
| 2002/0096375 | A1* | 7/2002 | Schmitz | B60W 50/082 180/65.245 |
| 2002/0096886 | A1* | 7/2002 | Schmitz | B60K 6/46 290/400 |
| 2011/0184644 | A1* | 7/2011 | McBurney | G01C 21/12 701/532 |
| 2012/0316771 | A1* | 12/2012 | Damon | G01C 21/3626 701/412 |
| 2014/0330453 | A1* | 11/2014 | Nakagawa | B60H 1/00428 701/2 |
| 2015/0142309 | A1* | 5/2015 | Sun | B60W 10/00 701/469 |
| 2015/0217754 | A1* | 8/2015 | MacNeille | B60W 10/26 701/22 |
| 2018/0096263 | A1* | 4/2018 | Modi | G07B 15/00 |
| 2018/0144622 | A1* | 5/2018 | Gage | H04N 7/188 |
| 2018/0170349 | A1* | 6/2018 | Jobson | B60W 50/0097 |
| 2019/0213883 | A1* | 7/2019 | Kim | G08G 1/146 |
| 2019/0277972 | A1* | 9/2019 | Carter | G01S 19/06 |

FOREIGN PATENT DOCUMENTS

| | | |
|---|---|---|
| KR | 10-1026557 B1 | 3/2011 |
| KR | 2017-0005311 A | 1/2017 |

* cited by examiner

SPATIAL DIVISION TYPE STOP CONTROL METHOD AND VEHICLE USING THE SAME

CROSS-REFERENCE TO RELATED APPLICATIONS

This application claims priority to Korean Patent Application No. 10-2017-0123930, filed on Sep. 26, 2017, which is incorporated herein by reference in its entirety.

BACKGROUND

Field of the Invention

The present invention relates to vehicle stopping control and, more particularly, to a vehicle using a stop control method implemented in a closed space in which the vehicle is switched to a slow moving or stopping state.

Description of Related Art

In general, the stop control of a vehicle is aimed at improving fuel efficiency, maintaining an interior of the vehicle comfortable, and preventing battery depletion while the vehicle travels at a low speed (e.g., slow moving) or is stopped. Particularly, the slow moving refers to the speed of the vehicle being about 10 KPH or less, and the stopped state may refer to the speed of the vehicle being 0 KPH when the vehicle is started. For example, the stop control is classified into engine on/off↔off/on switching control for improving fuel efficiency, full auto temperature control system (FATC) control for maintaining an interior comfortable, and low voltage DC/DC converter (LDC) control for preventing battery depletion.

The engine on/off↔off/on switching control is a method of switching an engine to be turned on or off based on a vehicle speed, a battery state of charge (SOC), a driver-required power, a FATC, or the like. The FATC control is a method of turning off an FATC by a driver when an air conditioner is operated or turning off the air conditioner when an engine is turned off, while it is a method of maintaining an engine on state until the driver turns off the FATC or the engine based on condition that a coolant temperature reaches a particular temperature or less when a heater is operated. The LDC control is a method of charging a 12V battery using an LDC or discharging the battery by adjusting the power of the LDC based on the state of the battery. In particular, "↔" is a sign indicative of a switch of control state. Accordingly, it may be possible to improve fuel efficiency by the engine on/off↔off/on switching control, maintain an interior comfortable by the FATC control, and maintain stability of SOC by the LDC control when the vehicle is stopped.

However, the stop control may cause the follow side effects since it does not consider an external environment change such as the slow moving or stopping of the vehicle. In particular, the external environment change refers an open space and a closed space. The open space is defined as ground, whereas the closed space is a location in which a gate (entrance and exit) is connected to the ground and is defined as a tunnel, an underpass, or an underground parking lot or surface parking lot of a building.

For example, the engine on/off↔off/on switching control in the closed space causes side effects such as occurrence of noise and exhaust emissions, compared to that in the open space. The noise occurs when the engine is maintained in the on state without regard for the condition of the underground parking lot even though the underground parking lot, in which significant engine noise occurs due to the characteristic thereof, or the closed surface parking lot is a destination. The exhaust emissions cause deterioration of air quality in the underground parking lot or the closed exhaust emission when the engine is maintained in the on state without regard for the condition of the underground parking lot in which it is difficult to discharge exhaust gas.

Additionally, the FATC control in the closed space causes side effects such as generation of odors in addition to occurrence of noise and exhaust emissions, compared to that in the open space. The noise and exhaust emissions occur when the engine is maintained in the on state by operation of the heater. The odors are generated when bacteria are propagated due to moisture in the evaporator while the air conditioner is continuously operated. For example, the LDC control in the closed space causes side effects such as battery depletion, compared to that in the open space. The battery depletion is further caused when a device for imaging the outside of the vehicle (e.g., a camera imaging device called a black box) is continuously operated after the vehicle is parked even though the state of charge (SOC) of an auxiliary battery (e.g., a 12V battery) is low before the vehicle is parked.

Hence, the stop control of the vehicle located in the closed space may cause customer dissatisfaction as well as noise, exhaust emissions, odors, battery depletion, etc., which may be related to vehicle quality issues, compared to that in the open space. Particularly, since the stop control is applied to eco-friendly vehicles, such as a hybrid electric vehicle (HEV), a plug-in hybrid electric vehicle (PHEV), an electric vehicle (EV), a fuel cell electric vehicle (FCEV), and a mild hybrid electric vehicle (MHEV), together with gasoline/diesel vehicles, it is necessary to resolve side effects such as noise, exhaust emissions, odors, and battery depletion in all vehicles.

SUMMARY

An exemplary embodiment of the present invention provides a spatial division type stop control method capable of resolving side effects such as noise, exhaust emissions, odors, and battery depletion while improving fuel efficiency through engine on/off↔off/on switching control, maintaining an interior comfortable through FATC control, and preventing battery depletion through LDC control by performing stop control of a vehicle in a dual control manner such as open space stop control and closed space stop control, and particularly of connecting with global positioning system information to discriminate between an open space and a closed space, thereby providing a driver's selection function for a dual stop control mode when the vehicle travels and then enters an underground parking lot, which is a destination, and a vehicle using the same.

Other objects and advantages of the present invention may be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with an exemplary embodiment of the present invention, a spatial division type vehicle control method may include dividing an open space from a closed space, in which a gate is connected to the ground, by a controller to apply an open space stop control mode to the open space and to apply a closed space stop control mode to the closed space, and performing spatial division stop control in which a control condition for each of an engine power, a vehicle interior temperature, and a battery SOC is varied between the open space stop control mode and the closed space stop control mode when a vehicle enters the closed space.

The open space stop control mode and the closed space stop control mode may be provided or output to a driver by a pop-up window or a selection button. The controller may be connected to a global positioning system (GPS) to divide the closed space from the open space. The controller may be connected to a navigation system to detect whether the vehicle enters and advances to the closed space using map information displayed on the navigation system. The controller may be configured to adjust the engine power by switching an engine on and off, adjust the vehicle interior temperature by switching an air conditioner on and off and a heater of an FATC, and adjust the battery state of charge (SOC) by charging and discharging an LDC.

The spatial division stop control may be divided into (A) entering stop control when the vehicle is decelerated to a particular speed, (B) detecting a specific feature displayed on map information of a navigation system in the closed space and then dividing the closed space from the open space at a destination set on the map information, (C) monitoring the open space when a GPS is turned on and the closed space when the GPS is turned off, dividing the stop control into the open space stop control mode and the closed space stop control mode, (D) adjusting the engine power, the vehicle interior temperature, and the battery SOC under the control condition of the closed space stop control mode when the vehicle enters the closed space, and (E) adjusting the engine power, the vehicle interior temperature, and the battery SOC under the control condition of the open space stop control mode when the vehicle enters the open space.

The closed space stop control mode may be performed by (D-1) an underground parking lot control mode based on that an engine is turned off in an underground parking lot when the vehicle enters the closed space, by (D-2) an underground parking lot continuous mode configured to continuously determine whether to satisfy conditions that the vehicle exits from the underground parking lot on the map information of the navigation system, the GPS is turned on, and the vehicle is stopped and to store the underground parking lot control mode when the conditions that the vehicle exits from the underground parking lot on the map information of the navigation system, the GPS is turned on, and the vehicle is stopped are satisfied, by (D-3) an underground parking lot restart mode based on the engine is turned on when the vehicle is started after the underground parking lot control mode is stored, and by (D-4) an underground parking lot release mode in which the underground parking lot control mode is stopped when the outside of the underground parking lot is displayed or the GPS is turned on.

The underground parking lot control mode may be performed by automatic or manual selection. The underground parking lot control mode may be divided into engine on/off switching control and engine on maintaining control of the engine to adjust the engine power. The engine on/off switching control may be performed by (D-1-1) determining whether an FATC for adjusting the vehicle interior temperature is stopped by turning off an air conditioner or a heater of the FATC, by (D-1-2) adjusting charge of an LDC for adjusting the battery SOC when the FATC is determined to be stopped, and by (D-1-3) switching from an engine on state to an engine off state when the battery SOC is satisfied after the charge of the LDC is adjusted.

Further, the engine on maintaining control may be performed by (D-1-4) determining whether an FATC for adjusting the vehicle interior temperature is stopped by turning off an air conditioner or a heater of the FATC, by (D-1-5) adjusting charge of an LDC for adjusting the battery SOC when the FATC is determined to be stopped, and by (D-1-6) maintaining an engine on state when the battery SOC is insufficient after the charge of the LDC is adjusted or when a motor discharge power is less than a driver-required power after the engine is turned off.

The underground parking lot restart mode may be divided into engine off/on switching control and engine off maintaining control of the engine for adjusting the engine power, and LDC charge-oriented control of an LDC for adjusting the battery SOC. The engine off/on switching control may be performed by (D-3-1) determining whether an FATC for adjusting the vehicle interior temperature is operated by turning on an air conditioner or a heater of the FATC, and by (D-3-2) switching from an engine off state to an engine on state when a motor discharge power is less than a driver-required power when the battery SOC is insufficient or the engine is turned off.

Further, the engine off maintaining control may be performed by (D-3-3) determining whether an FATC for adjusting the vehicle interior temperature is stopped by turning off an air conditioner or a heater of the FATC, and by (D-3-4) maintaining an engine off state when the battery SOC is satisfied. The LDC charge-oriented control of the LDC may be performed by (D-3-5) determining whether an auxiliary battery SOC of the battery SOC is satisfied, by (D-3-6) discharging an auxiliary battery by adjusting discharge of the LDC for adjusting the battery SOC when the auxiliary battery SOC is determined to be satisfied, and by (D-3-7) charging the auxiliary battery by the adjusting charge of the LDC when the auxiliary battery SOC is determined to be insufficient.

In accordance with another exemplary embodiment of the present invention, a vehicle may include a controller configured to divide an open space from a closed space, in which a gate is connected to the ground, and to vary a control condition for each of an engine power, a vehicle interior temperature, and a battery SOC between open space stop control applied to the open space and closed space stop control applied to the closed space when a vehicle is stopped by deceleration, an engine electronic control unit (ECU) configured to adjust the engine power by switching an engine on and off, an FATC ECU configured to adjust the vehicle interior temperature by switching an air conditioner on and off and a heater of an FATC, and an LDC ECU configured to adjust the battery SOC by charging and discharging an LDC.

The controller may be connected to a spatial division map, and the spatial division map may include an open space stop control table connected to the open space stop control and a closed space stop control table connected to the closed space stop control. The controller may be configured to determine the division of the closed space and the open space according to whether to receive a GPS signal. The controller may further be configured to determine entry and advance to the closed space using map information displayed on a navigation system.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
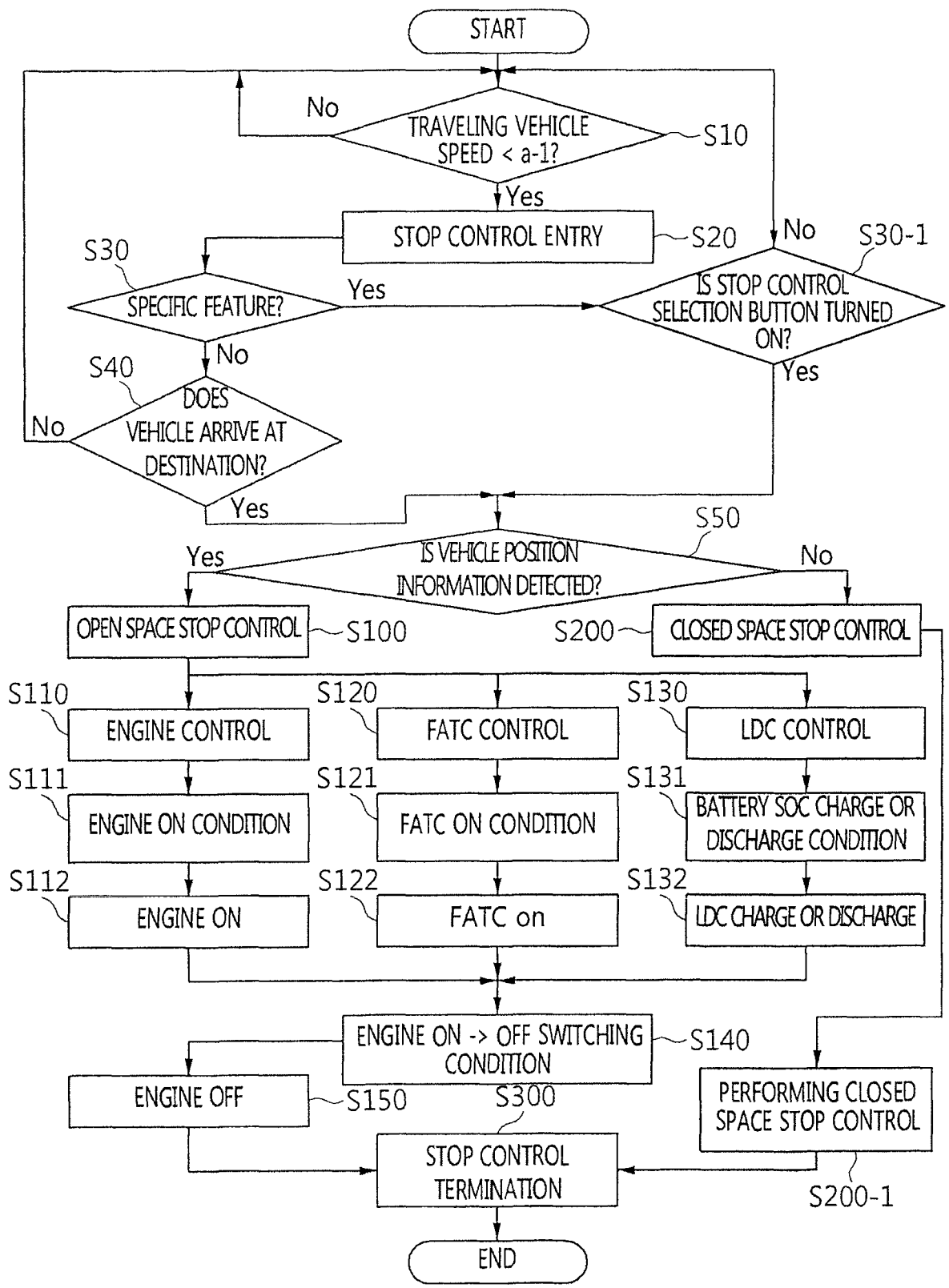
FIG. 1 is a flowchart illustrating a spatial division type stop control method divided into open space stop control and closed space stop control according to an exemplary embodiment of the present invention.

Referring to FIG. 1, a vehicle stopping control method may monitor a stop control condition (S10 to S50) using navigation information and GPS signals through a stop control entry mode when a vehicle is at a speed less than a particular speed, perform stop control divided into an open space stop control mode (S100), in which the GPS signals are received, and a closed space stop control mode to perform the closed space stop control (S200 and S200-1), in which the GPS signals are not received, through a GPS spatial division mode, and then terminate the stop control (S300). Accordingly, the vehicle stopping control method is characterized by spatial division stop control different from existing stop control.

Figure 2:
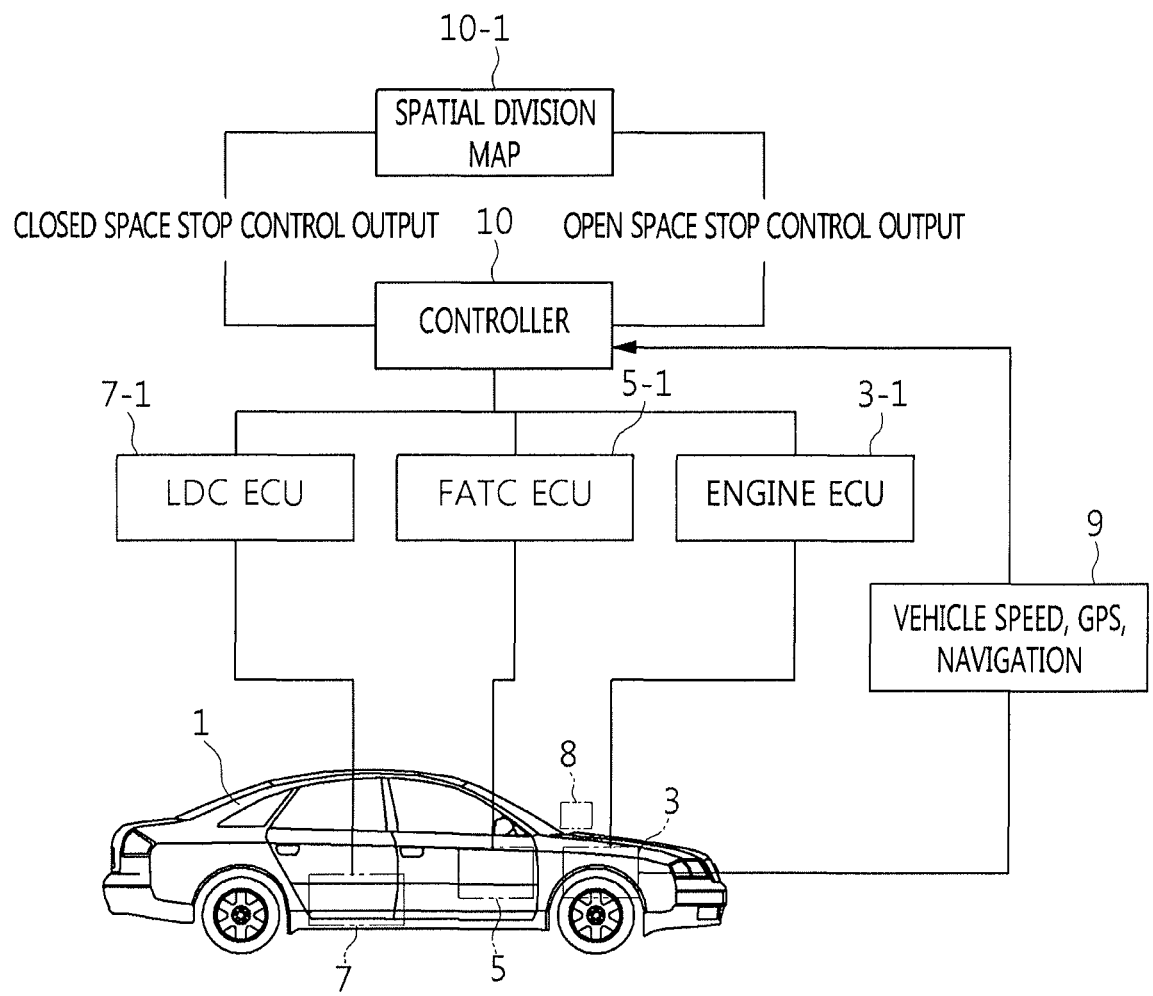
FIG. 2 is a diagram illustrating an example of a vehicle using spatial division type stop control according to the exemplary embodiment of the present invention.

Referring to FIG. 2, a vehicle 1 may include an engine 3, a full auto temperature control system (FATC) 3, a low voltage direct current/direct current (DC/DC) converter (LDC) 7, a navigation system 8, a vehicle-mounted sensor 9, and a controller 10 configured to execute spatial division type stop control. Although not illustrated in the drawing, the vehicle 1 may include a main battery and an auxiliary battery that are charged and discharged. The controller 10 may be configured to operate the other components of the vehicle 1.

For example, the engine 3 is an internal combustion engine and may be operated by an engine electronic control unit (ECU) 3-1 configured to process signals detected by the vehicle-mounted sensor. The FATC 5 may include an air conditioner and a positive temperature coefficient type heater and may be operated by an FATC ECU 5-1 to maintain a comfortable interior space by automatically adjusting a blow direction and introduction of air volume, inside air, and outside air. The LDC 7 may be configured to store electric energy in a 12V battery constituting a battery system together with a 48V battery and convert a 12V voltage. The LDC 7 may be operated by an LDC ECU 7-1 to charge the 12V battery based on the state of the battery or discharge the battery by adjusting the power thereof. The LDC ECU 7-1 may be a converter. In particular, each of the engine ECU 3-1, the FATC ECU 5-1, and the LDC ECU 7-1 may be operated based on the open space stop control and the closed space stop control by the controller 10.

For example, the navigation system 8 is an audio & video navigation (AVN) system configured to perform a basic function such as a traveling path setting from a departure point toward a destination and voice information guidance on a vehicle position based on a GPS signal. In particular, the navigation system 8 may be connected to a stop control spatial division mode to display GPS signal reception on a pop-up window for open space stop control and display GPS signal interruption on a pop-up window for closed space stop control, thereby providing driver's selection for stop control. Accordingly, the navigation system 8 may be configured to transmit navigation information to the controller 10. For example, the vehicle-mounted sensor 9 may be configured to detect operation states of the engine 3, the FATC 5, and the LDC 7 and transmit the states to the controller 10 together with the engine ECU 3-1, the FATC ECU 5-1, and the LDC ECU 7-1.

For example, the controller 10 may be configured to process the detection signal of the vehicle-mounted sensor 9 as input data, receive GPS signals, and operate the engine ECU 3-1, the FATC ECU 5-1, and the LDC ECU 7-1 under stop control conditions while opening pop-up windows for open/closed space stop control of the navigation system 8 by open/closed space stop control output. In particular, the controller 10 may provide driver's selection for entry to an underground parking lot mode by displaying the pop-up window of the navigation system 8, displaying the screen of the cluster, or turning a stop control selection button of a driver seat on or off. In addition, the spatial division map 10-1 may be connected to the controller 10. In particular, the spatial division map 10-1 establishes an open space stop control table and a closed space stop control table for each of the engine 3, the FATC 5, and the LDC 7 and may transmit open space stop control output and closed space stop control output to the controller 10.

Hereinafter, the spatial division stop control method in FIG. 1 will be described in detail with reference to FIGS. 2 to 6. In particular, a control subject is the controller 10 connected to the spatial division map 10-1 to operate the engine ECU 3-1, the FATC ECU 5-1, and the LDC ECU 7-1, and a control target is the engine 3 operated by the engine ECU 3-1, the FATC 5 operated by the FATC ECU 5-1, and the LDC 7 operated by the LDC ECU 7-1. Although the underground parking lot will be described to be a control space below, the closed surface parking lot is equally applied when it is in the same environment as the underground parking lot. The controller 10 may be configured to execute the stop control entry mode by a vehicle speed determination step S10, a stop control entry step S20, a specific feature check step S30, a vehicle destination arrival determination step S40, and a vehicle position information detection step S50.

Referring to FIG. 2, the controller 10 may be configured to perform the vehicle speed determination S10 by a vehicle speed determination equation "traveling vehicle speed<a−1" using the speed of the vehicle which is the detection signal of the vehicle-mounted sensor 9. In particular, "traveling vehicle speed" refers to a vehicle speed at the time of detection, "a" is a set vehicle speed set as about 10 KPH that refers to slow moving, and "<" is a sign of inequality indicative of the size between two values. As a result, the controller 10 may be configured to determine whether the vehicle enters a specific feature (S30) and reaches a destination (S40) after entering stop control (S20) when the current traveling vehicle speed is less than the set vehicle speed of about 10 KPH.

The controller 10 may be configured to determine whether the specific feature exists (S30) using information of a tunnel or an underground parking lot displayed on the map of the navigation system 8. Then, the controller 10 may be configured to permit the stop control selection button to be turned on (S30-1) when the specific feature exists, whereas the controller 10 may be configured to determine whether the vehicle reaches the destination (S40) using destination information set by the navigation system 8 when the specific feature does not exist. As a result, when the stop control selection button is turned off or the vehicle does not reach the destination, the controller 10 may return the process back to S10 to repeat the previous procedure.

Furthermore, when the stop control selection button is turned on or the vehicle reaches the destination, the controller 10 may be configured to detect vehicle position information using a GPS signal (S50). As a result, the stop control entry mode may be switched into the GPS spatial division mode, and thus, the controller 10 may be configured to perform the open space stop control mode (S100) when the GPS signal is received and may be configured to perform the closed space stop control mode (S200) when the GPS signal is not received. The controller 10 may be configured to perform the open space stop control mode (S100) by an engine control S110, an FATC control S120, an LDC control S130, an engine on/off determination S140, an engine off S150, and a stop control termination S300.

Referring to FIG. 2, the controller 10 may be configured to transmit the open space stop control output connected to the open space stop control table of the spatial division map 10-1 to each of the engine ECU 3-1, the FATC ECU 5-1, and the LDC ECU 7-1 to perform stop control for each of the engine 3, the FATC 5, and the LDC 7.

For example, in the engine control (S110), an engine on condition may be determined based on the vehicle speed, the driver-required power, the FATC on signal, and the battery SOC. When the engine on condition is satisfied, the engine on state is maintained (S112). In the FATC control (S120), an FATC on condition may be determined when the air conditioner or the heater is turned on. When the FATC on condition is satisfied, the FATC on state may be maintained (S121). In the LDC control (S130), the LDC may be charged or discharged (S132) based on the battery SOC (S131). In the engine on/off determination (S140), whether the engine is switched from an on state or from an off state may be determined based on the engine on (S112), the FATC on (S122), the starting off signal after the LDC is charged or discharged (S132), and the FATC off signal. The stop control may be terminated as in S300 by the engine off (S150) under the engine off condition.

Accordingly, in the open space stop control mode (S100), the engine may be maintained in the on state in response to the FATC engine on signal by the vehicle speed, the SOC, the driver-required power, and the coolant temperature equal to or less than a particular temperature when the heater of the FATC is operated, the engine may be switched off in response to the FATC off signal by the driver when the engine is turned off or the air conditioner of the FATC is operated, and the LDC control may be performed by charging the 12V battery using the LDC or discharging the battery by adjusting the power of the LDC. Therefore, in the open space stop control mode (S100), the engine on/off control is not performed and the LDC control is not differentiated due to variation in geographical information such as destination information. As a result, the fuel efficiency may be improved by the engine on/off control, the interior may be maintained comfortable by the FATC control, and the same stop control effect as the existing stop control logic may be implemented by preventing battery depletion by the LDC control.

Meanwhile, in the closed space stop control mode (S200), the controller 10 may be configured to transmit the closed space stop control output connected to the closed space stop control table of the spatial division map 10-1 to each of the engine ECU 3-1, the FATC ECU 5-1, and the LDC ECU 7-1 to perform stop control for each of the engine 3, the FATC 5, and the LDC 7, as illustrated in FIG. 2. This is implemented in the underground parking lot in which the GPS signal is not received, as in FIGS. 3 to 6. However, the closed space stop control mode (S200) may be equally implemented in the tunnel, the underpass, or the closed surface parking lot since it is recognized as the underground parking lot by turning on the stop control selection button (S30-1) in the tunnel or the underpass in which the vehicle is congested and the GPS signal is not received.

As a result, the closed space stop control mode (S200) may implement an effect of improving fuel efficiency by adjusting brightness of a headlight, a cluster, and an AVN in addition to the engine on/off, the FATC, and the LDC, an effect of minimizing the use of the air conditioner in the underground parking lot without direct sunlight using the operation of the air conditioner in the underground parking lot restart mode, an effect of applying LDC discharge orientation for improving fuel efficiency when the vehicle enters the underground parking lot, and the like.

Figure 3:
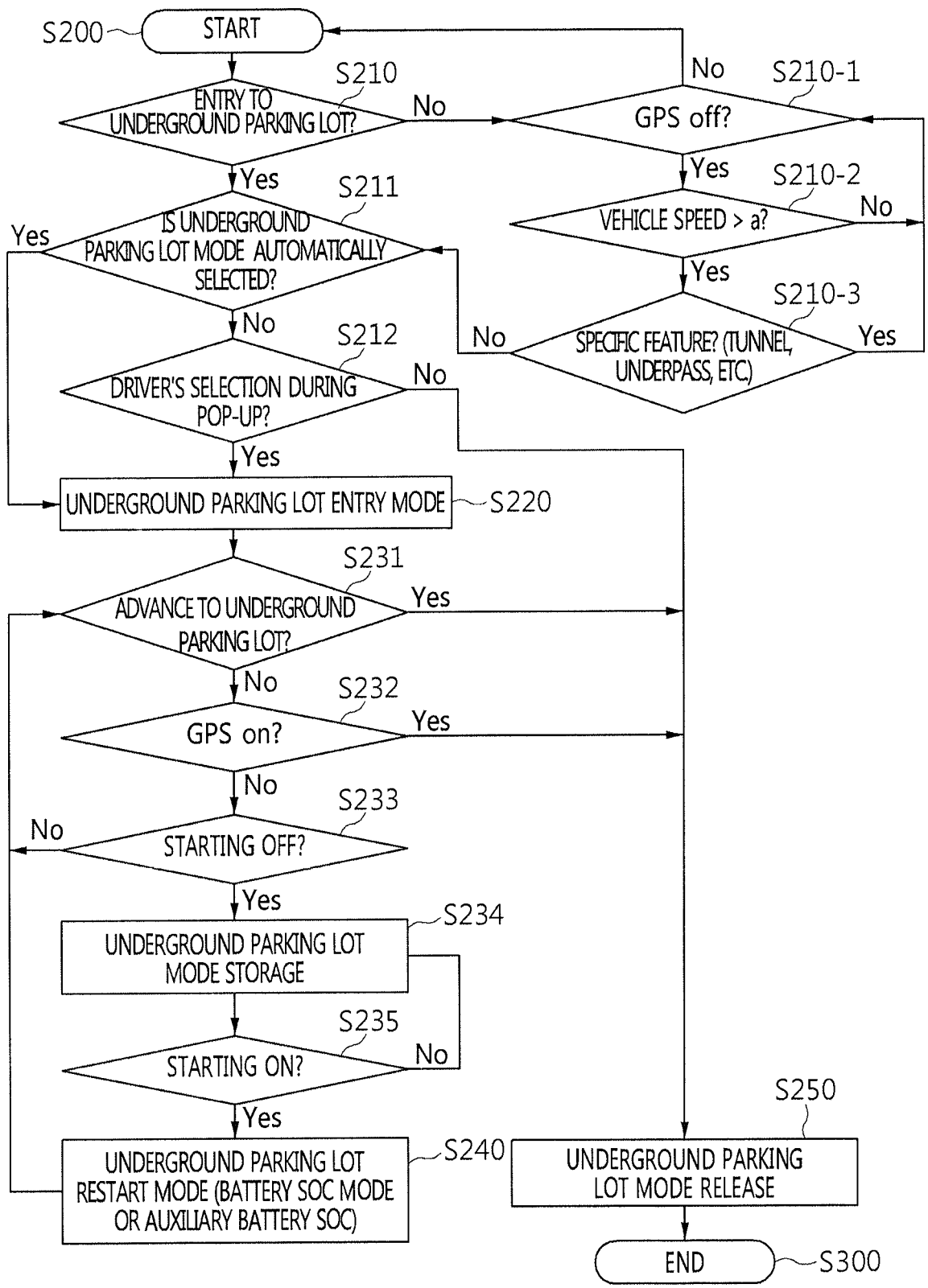
FIG. 3 is a flowchart illustrating that the closed space stop control is performed in a specified underground parking lot according to the exemplary embodiment of the present invention.

Referring to FIG. 3, the closed space stop control mode (S200) may be performed by an underground parking lot selection step S210 to S212, an underground parking lot control mode step S220, an underground parking lot continuous mode step S231 to S235, an underground parking lot restart mode step S240, and an underground parking lot release mode step.

In particular, the underground parking lot selection step may be implemented by whether the entry to the underground parking lot is performed (S210), whether the underground parking lot mode is automatically selected (S211), and whether the underground parking lot mode is manually selected (S212). The entry to the underground parking lot (S210) may be monitored using the map information of the navigation system 8. The underground parking lot monitoring step, which is divided into whether the GPS is turned off (S210-1), whether the set vehicle speed is satisfied (S210-2), and whether the entry to the specific feature such as the tunnel or the underpass is performed (S210-3), may be performed to clearly detect whether the vehicle enters the underground parking lot, instead of the tunnel or the underpass, at a speed greater than a particular vehicle speed (a) (e.g., 0 KPH) when the GPS signal is not received. In particular, when the GPS signal is received, the process may return to S210 to repeat the underground parking lot entry determination. However, since the vehicle speed determination (S10) and the specific feature monitor (S30) may be performed in the stop control entry mode which is a previous step of the underground parking lot monitor step, the underground parking lot monitor step may be omitted from the underground parking lot selection step.

In the underground parking lot selection step, after the vehicle enters the underground parking lot monitored by the map information of the navigation system 8, the vehicle may enter the underground parking lot control mode (S220) in an automatic manner without driver's selection or a manual manner with driver's selection. In particular, the underground parking lot control mode step may be performed by the underground parking lot entry mode (S220). After the entry to the underground parking lot control mode may be performed by automatically selecting the underground parking lot mode (S211) or manually selecting the underground parking lot mode (S212), the underground parking lot control mode may return to the underground parking lot advance determination step S231 to determine whether an underground parking lot continuous mode is released through the underground parking lot continuous mode step. The underground parking lot control mode step will be described with reference to FIG. 4.

Particularly, the underground parking lot continuous mode step may be performed by whether the vehicle advances to the underground parking lot (S231), whether GPS off is switched to GPS on by receiving the GPS signal (S232), whether the engine is turned off (S233), underground parking lot mode storage (S234), and a switch from engine off to engine on (S235). In addition, the advance to the underground parking lot (S231) may be monitored by the map information of the navigation system 8. Particularly, the underground parking lot mode (S234) may be stored when the engine is turned off in the GPS off state in the underground parking lot, and thus may be used to update data of the closed space stop control table of the spatial division map 10-1.

Further, the underground parking lot restart mode step may be performed by an underground parking lot restart mode (S240). The underground parking lot restart mode may be performed when the engine is turned on (S235) after the underground parking lot mode storage (S234) and then may return to the underground parking lot advance determination step (S231) to repeat whether the underground parking lot continuous mode is released. The underground parking lot restart mode step will be described with reference to FIGS. 5 and 6.

In particular, the underground parking lot release mode step may be performed by an underground parking lot release mode (S250). The underground parking lot release mode may be immediately performed when the vehicle advances to the underground parking lot (S231) or the GPS is switched to be turned on (S232). Therefore, the underground parking lot release mode refers the stop control termination (S300) according to the termination of the closed space stop control mode (S200).

Figure 4:
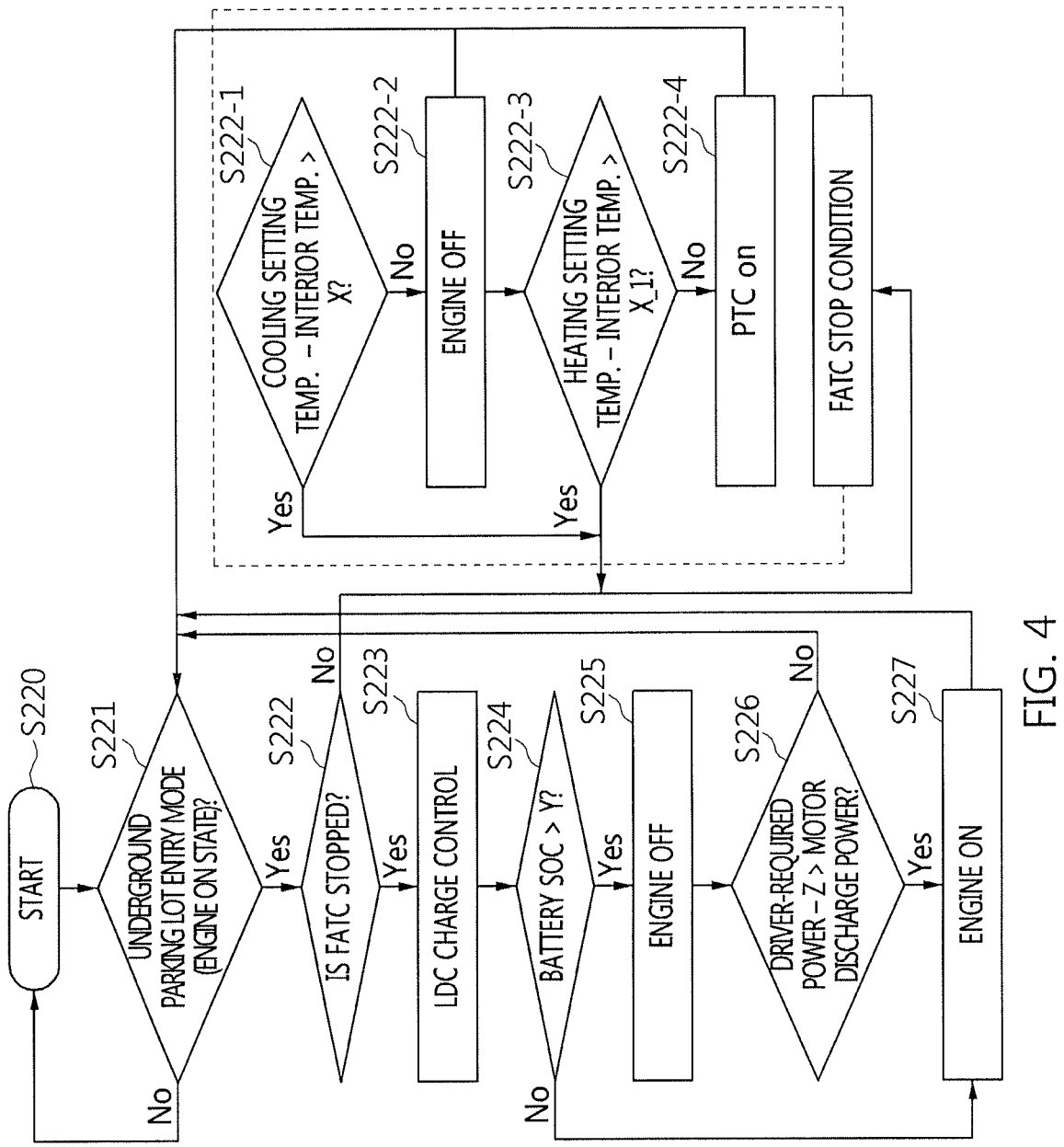
FIG. 4 is a flowchart illustrating engine on/off/on switching control in an underground parking lot control mode according to the exemplary embodiment of the present invention.

Meanwhile, refereeing to the underground parking lot control mode step in FIG. 4, the underground parking lot control mode may be performed by engine on/off switching control (S225) and engine on maintaining control (S227) when the engine is turned on after detecting the entry to the underground parking lot (S221). The engine on/off switching control may be performed in a battery SOC satisfaction state (S224) after LDC charge control (S223) in an FATC stop state (S222). Further, the engine on maintaining control may be immediately performed in a battery SOC insufficient state (S224) after the LDC charge control (S223) in the FATC stop state (S222), or may be performed in a driver-required power satisfaction condition (S226) after the engine on/off switching control (S225).

In particular, the FATC stop control (S222) may be performed under an FATC stop condition, and the FATC stop condition may be determined based on whether the air conditioner and the heater are used. For example, since the process may return to the underground parking lot entry monitor step (S221) when the air conditioner is turned on (S222-2) based on the cooling temperature (S222-1) or the heater (e.g., PTC) is turned on (S222-4) based on the heating temperature (S222-3), the FATC stop condition is satisfied when the air conditioner is turned off and the heater is turned off. In particular, the controller 10 may be configured to apply a cooling temperature determination equation to the cooling temperature (S222-1), apply a heating temperature determination equation to the heating temperature (S222-3), apply a battery determination equation to the battery SOC (S224), and apply a required power determination equation to whether the driver-required power is satisfied.

Cooling temperature determination equation: cooling setting temperature−interior temperature>X, Heating temperature determination equation: heating setting temperature−interior temperature>X_1, Battery determination equation: battery SOC>Y, and Required power determination equation: driver-required power−Z>motor discharge power.

In particular, "−" is a minus sign, and ">" is a sign of inequality indicative of the size between two values. "Interior temperature" is a current detected interior temperature of the vehicle 1, "cooling setting temperature" is a temperature value set as about 18 to 22° C. for comfortableness, and "heating setting temperature" is a temperature value set as about 15 to 20° C. for comfortableness. "X" is an air conditioner operation threshold set as about 5° C., and "X−1" is a heater operation threshold set as about 10° C. "Battery SOC" is a current detected charge value of a main battery, and "Y" is a battery charge threshold set as 80% SOC, or may coincide with an engine idle charge entry value or a specific engine idle charge entry value (e.g., engine idle charge−α (set value)). "Driver-required power" is a device power consumption required to operate a vehicle-mounted device required for consumption of the battery, "motor discharge power" is a motor driving power for driving the motor, and "Z" is set as a power threshold (e.g., watt). However, the set value of each of "X", "X−1", "Y", and "Z" may be properly varied based on the vehicle and the driving region thereof.

As a result, in the underground parking lot control mode (S220), the condition that "cooling setting temperature−interior temperature" is greater than "X" or "heating setting temperature−interior temperature" is greater than "X_1", the condition that "battery SOC" is greater than "Y", and the condition that "driver-required power−Z" is less than "motor discharge power" are applied as the condition for the engine on/off switching control. Further, the condition that "cooling setting temperature−interior temperature" is smaller than "X" or "heating setting temperature−interior temperature" is less than "X_1", the condition that "battery SOC" is less than "Y", and the condition that "driver-required power−Z" is greater than "motor discharge power" may be applied as the condition for the engine on maintaining control.

Therefore, the underground parking lot control mode (S220) may maintain the engine off state to the maximum until the vehicle enters and then advances to the underground parking lot by the engine on/off control in which the motor discharge power is restricted to be less than the driver-required power by the restriction of the motor or the battery which may cause issues when or while the time when the engine is turned on is equal to that of the idle charge entry or it is necessary to prevent the battery from being discharged to a particular SOC or less to which the specific idle charge entry value (idle charge−a) may be applied considering the underground parking lot, or while the vehicle is being driven.

Particularly, the present invention aims at minimizing occurrence of evaporator moisture due to the air conditioner off and improving fuel efficiency by preferentially turning off the engine, and suppresses a switch to engine on to the maximum by restricting heater operation to the temperature at which the driver feels cold from the temperature at which the difference between the set temperature and the interior temperature is equal to or greater than a certain temperature.

Figure 5:
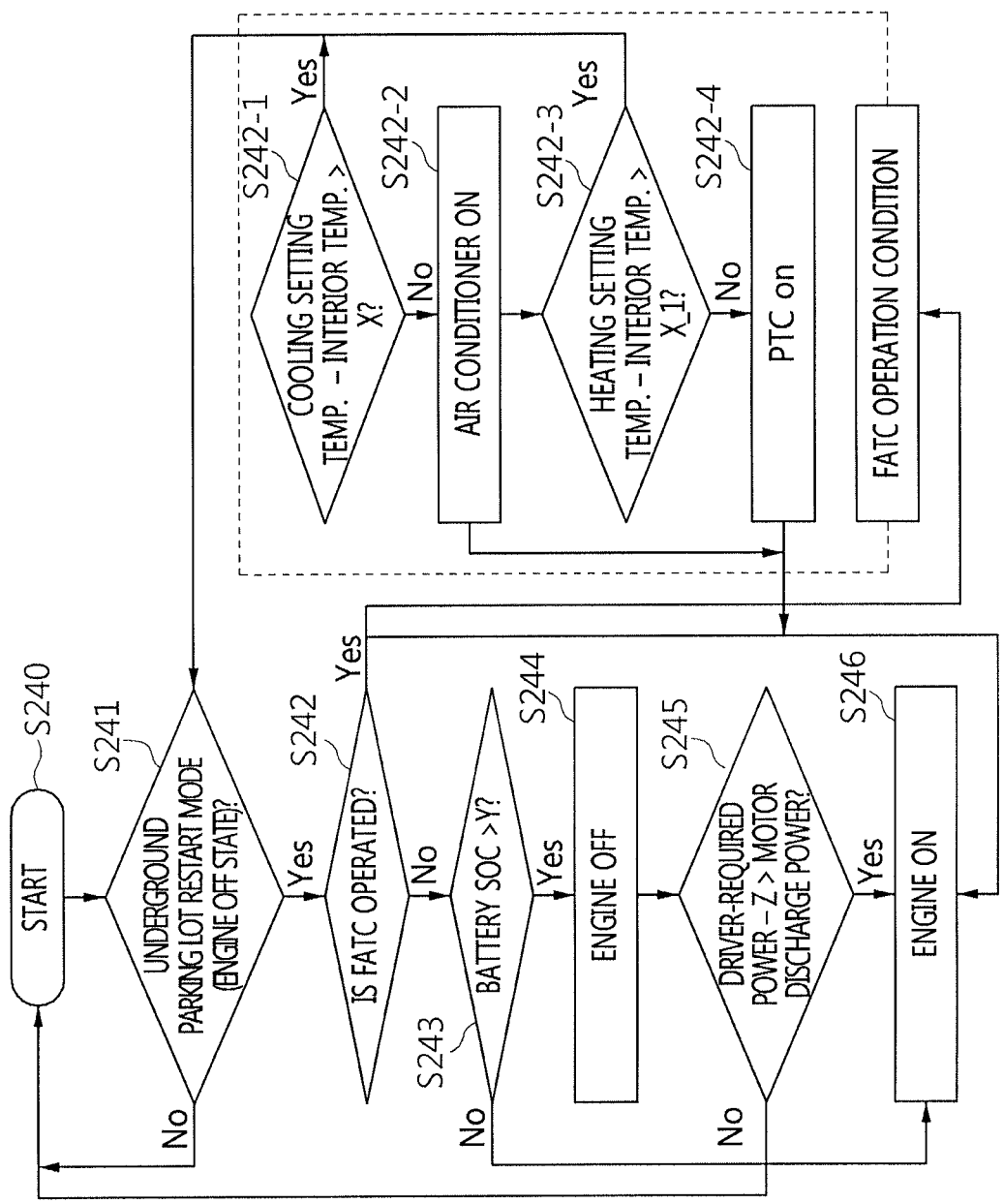
FIG. 5 is a flowchart illustrating engine off/on switching control in an underground parking lot restart mode according to the exemplary embodiment of the present invention.
Figure 6:
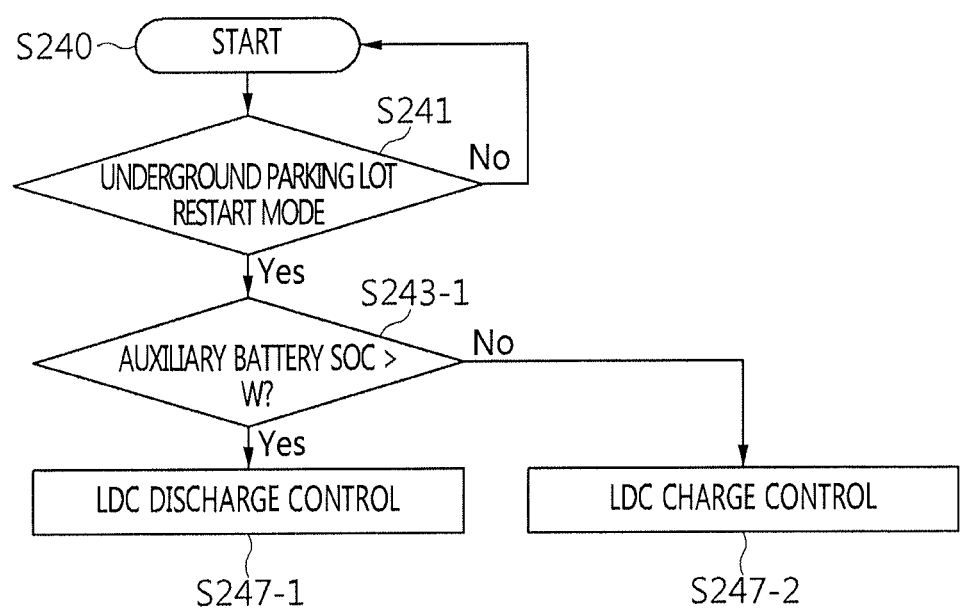
FIG. 6 is a flowchart illustrating LDC charge-oriented control in the underground parking lot restart mode according to the exemplary embodiment of the present invention.

Meanwhile, the underground parking lot restart mode step (S240) may be divided into an engine off/on switching control and an engine off maintaining control in FIG. 5, and an LDC charge-oriented control in FIG. 6. Referring to FIG. 5, the engine off/on switching control and the engine off maintaining control in the underground parking lot restart mode step (S240) may be performed by engine off maintaining control (S244) and engine off/on switching control (S246) in the engine off state after detecting the underground parking lot restart (S241). The engine off maintaining control may be performed in a battery SOC satisfaction state (S243) in an FATC stop state (S242). Further, the engine off/on switching control may be performed immediately in a battery SOC insufficient state (S243) in an FATC operation state (S242), or may be performed under a driver-required power satisfaction condition (S245) in an engine off maintaining control state (S244).

In particular, the FATC operation control (S242) may be performed under an FATC operation condition, and the FATC operation condition may be determined based on whether the air conditioner and the heater are used. For example, since the engine is switched to be turned on (S246) when the air conditioner is turned on (S242-2) based on the cooling temperature (S242-1) or the heater (e.g., PTC) is turned on (S222-4) based on the heating temperature (S222-3), the FATC operation condition may be satisfied when the air conditioner is turned on and the heater is turned on. In particular, the controller 10 may be configured to apply a cooling temperature determination equation to the cooling temperature (S242-1), apply a heating temperature determination equation to the heating temperature (S242-3), apply a battery determination equation to the battery SOC (S243), and apply a required power determination equation to whether the driver-required power is satisfied.

Cooling temperature determination equation: cooling setting temperature−interior temperature>X, Heating temperature determination equation: heating setting temperature−interior temperature>X_1, Battery determination equation: battery SOC>Y, and Required power determination equation: driver-required power−Z>motor discharge power.

Accordingly, the determination equation in the underground parking lot restart mode step is illustrated to be equal to that in the underground parking lot control mode step. As a result, in the underground parking lot restart mode (S240), the condition that "cooling setting temperature−interior temperature" is less than "X" or "heating setting temperature−interior temperature" is less than "X_1", the condition that "battery SOC" is less than "Y", and the condition that "driver-required power−Z" is greater than "motor discharge power" are applied as the condition for the engine off/on switching control. Further, the condition that "cooling setting temperature−interior temperature" is greater than "X" or "heating setting temperature−interior temperature" is greater than "X_1", the condition that "battery SOC" is greater than "Y", and the condition that "driver-required power−Z" is less than "motor discharge power" may be applied as the condition for the engine off maintaining control.

Referring to FIG. 6, the LDC charge-oriented control in the underground parking lot restart mode (S240) may be performed by LDC discharge control (S247-1) and LDC charge control (S247-2) in the battery SOC satisfaction state (S243-1) in the engine off state after detecting the underground parking lot restart (S241). The controller 10 may be configured to apply a charge-oriented control determination equation to the auxiliary battery SOC (S243-1).

Charge-oriented control determination equation: auxiliary battery SOC>$W$.

In particular, ">" is a sign of inequality indicative of the size between two values. "Auxiliary battery SOC" is a current detected charge value of the auxiliary battery. "W" is an auxiliary battery charge threshold set as 70% SOC, or may coincide with an engine idle charge entry value or a specific engine idle charge entry value (e.g., engine idle charge−(set value)). However, the set value of "W" may be properly varied based on the vehicle and the driving region thereof.

As a result, the LDC discharge control (S247-1) may be performed when "auxiliary battery SOC" is greater than "W", whereas the LDC charge control (S247-2) may be performed when "auxiliary battery SOC" is less than W. Therefore, since the LDC is minimally used or is not used until the vehicle advances to the underground parking lot by the engine off/on switching control in the underground parking lot restart mode (S240), the deterioration of the main battery SOC may be minimized. The LDC charge-oriented control may be performed when the auxiliary battery has a minimal SOC.

As described above, the spatial division type stop control method for vehicle according to the exemplary embodiment of the present invention may perform the spatial division stop control which is divided into the open space stop control applied to the open space and the closed space stop control applied to the closed space, and to vary the control condition for each of the engine power, the vehicle interior temperature, and the battery SOC. Since the open space stop control and the closed space stop control are differently performed according to the condition for each of the engine power control by the on/off switching control of the engine 3, the vehicle interior temperature adjustment by the on/off switching adjustment of the air conditioner and the heater of the FATC 5, and the battery SOC adjustment by the charge and discharge control of the LDC 7, unnecessary noise, exhaust emissions, odors, and battery depletion may be prevented in the space such as the underground parking lot or the closed surface parking lot.

The vehicle of the present invention has the following advantages and effects by implementing a dual stop control mode based on spatial division of an open space and a closed space. The present invention has an effect of improving fuel efficiency by the closed space stop control. Firstly, it may be possible to improve fuel efficiency by about 5% in the winter through engine on/off↔off/on switching control and FATC control in an underground parking lot or a closed surface parking lot. Secondly, it may be possible to further improve fuel efficiency by adjusting the brightness of a headlight, a cluster, and an audio & video navigation (AVN) system in addition to executing on/off of an engine, an FATC, and an LDC. Thirdly, it may be possible to reduce cost of maintenance during charging an external power source by turning off the engine in a vehicle such as a PHEV capable of being charged from the outside.

The present invention has an effect of enhancing performance by the closed space stop control. Firstly, in an HEV/PHEV vehicle in which substantial noise occurs when the engine is turned on, as compared to when the engine is turned off, it may be possible to reduce substantial noise caused when the engine is turned on in the underground parking lot or the closed surface parking lot. Secondly, it may be possible to minimize battery depletion when the vehicle is parked and then restarted due to use of many electrical loads such as a black box, by minimizing the battery depletion through LDC control in the underground parking lot or the closed surface parking lot. Thirdly, it may be possible to prevent occurrence of odors when an air conditioner is continuously operated by not performing unnecessary FATC control.

The present invention has an effect of increasing marketability by the closed space stop control. Firstly, it may be possible to deal with customer complaints such as noise, exhaust emissions, odors, and battery depletion through the closed space stop control in the underground parking lot or the closed surface parking lot, and to affirmatively improve marketability and resolve customer dissatisfaction. Secondly, it may be possible to reduce the use of the air conditioner in the underground parking lot without direct sunlight or the closed surface parking lot. Thirdly, it may be possible to apply LDC discharge orientation for improving fuel efficiency when the vehicle enters the underground parking lot.

While the present invention has been described with respect to the exemplary embodiments, it will be apparent to those skilled in the art that various changes and modifications may be made without departing from the spirit and scope of the invention as defined in the following claims.

What is claimed is:

1. A method of controlling vehicle stopping, comprising:
dividing, by a controller, an open space from a closed space, in which a gate is connected to the ground to apply an open space stop control mode to the open space and to apply a closed space stop control mode to the closed space; and
performing, by the controller, spatial division stop control in which a control condition for each of an engine power, a vehicle interior temperature, and a battery state of charge (SOC) is varied between the open space stop control mode and the closed space stop control mode when a vehicle enters the closed space,
wherein the spatial division stop control is performed by:
  entering stop control when a current traveling speed of the vehicle is decelerated to less than a particular speed,
  monitoring a specific feature displayed on map information of a navigation system in the closed space and then dividing the closed space from the open space at a destination set on the map information,
  monitoring the open space when a GPS is turned on and the closed space when the GPS is turned off, dividing the stop control into the open space stop control mode and the closed space stop control mode,
  adjusting the engine power, the vehicle interior temperature, and the battery SOC under the control condition of the closed space stop control mode when the vehicle enters the closed space, and
  adjusting the engine power, the vehicle interior temperature, and the battery SOC under the control condition of the open space stop control mode when the vehicle enters the open space, and
wherein the closed space stop control mode is performed by:
  an underground parking lot control mode based on that an engine is turned off in an underground parking lot when the vehicle enters the closed space, an underground parking lot continuous mode configured to continuously determine whether to satisfy conditions that the vehicle exits from the underground parking lot based on the map information of the navigation system, the GPS is turned on, and the vehicle is stopped and to store the underground parking lot control mode for updating data of a closed space stop control table of a spatial division map when the conditions that the vehicle exits from the underground parking lot on the map information of the navigation system, the GPS is turned on, and the engine is turned off,
an underground lot restart mode based on the engine is turned on when the vehicle is started after the underground parking lot control mode is stored for updating data of the closed space stop control table of the spatial division map, and
an underground parking lot release mode in which the underground parking lot control mode is stopped when the outside of the underground parking lot is displayed or the GPS is turned on.

2. The method of claim 1, wherein the open space stop control mode and the closed space stop control mode are provided to a driver by a pop-up window or a selection button.

3. The method of claim 1, wherein the controller is connected to a navigation system to detect whether the vehicle enters and advances to the closed space using map information displayed on the navigation system.

4. The method of claim 1, wherein the closed space includes an underground parking lot, a surface parking lot, an underpass, and a tunnel.

5. The method of claim 1, wherein the underground parking lot control mode is performed by automatic or manual selection.

6. The method of claim 1, wherein the underground parking lot control mode is divided into engine on/off switching control and engine on maintaining control of the engine for adjusting the engine power.

7. The method of claim 6, wherein the engine on/off switching control is performed by determining whether a full auto temperature control (FATC) for adjusting the vehicle interior temperature is stopped by turning off an air conditioner or a heater of the FATC, by adjusting charge of a low voltage direct current/direct current (DC/DC) converter (LDC) configured to adjust the battery SOC when the FATC is determined to be stopped, and by switching from an engine on state to an engine off state when the battery SOC is satisfied after the charge of the LDC is adjusted.

8. The method of claim 6, wherein the engine on maintaining control is performed by determining whether a full auto temperature control (FATC) for adjusted the vehicle interior temperature is stopped by turning off an air conditioner or a heater of the FATC, by adjusting charge of a low voltage direct current/direct current (DC/DC) converter (LDC) configured to adjust the battery SOC when the FATC is determined to be stopped, and by maintaining an engine on state when the battery SOC is insufficient after the charge of the LDC is adjusted or when a motor discharge power is less than a driver-required power after the engine is turned off.

9. The method of claim 1, wherein the underground parking lot restart mode is divided into engine off/on switching control and engine off maintaining control of the engine for adjusting the engine power, and a low voltage direct current/direct current (DC/DC) converter (LDC) charge-oriented control of an LDC for adjusting the battery SOC.

10. The method of claim 9, wherein the engine off/on switching control is performed by determining whether a full auto temperature control (FATC) for adjusting the vehicle interior temperature is operated by turning on an air conditioner or a heater of the FATC, and by switching from an engine off state to an engine on state when a motor discharge power is less than a driver-required power in a state in which the battery SOC is insufficient or the engine is turned off.

11. The method of claim 9, wherein the engine off maintaining control is performed by determining whether a full auto temperature control (FATC) for adjusting the vehicle interior temperature is stopped by turning off an air conditioner or a heater of the FATC, and by maintaining an engine off state when the battery SOC is satisfied.

12. The method of claim 9, wherein the LDC charge-oriented control of the LDC is performed by determining whether an auxiliary battery SOC of the battery SOC is satisfied, by discharging an auxiliary battery by controlling discharge of the LDC for adjusting the battery SOC when the auxiliary battery SOC is determined to be satisfied, and by charging the auxiliary battery by the adjusting charge of the LDC when the auxiliary battery SOC is determined to be insufficient.

13. A vehicle, comprising:
a controller performing a method of controlling vehicle stopping as defined in claim 1;
an engine electronic control unit (ECU) configured to adjust the engine power by switching an engine on and off;
a full auto temperature control system (FATC) ECU configured to adjust the vehicle interior temperature by switching an air conditioner on and off and a heater of an FATC; and
a low voltage direct current/direct current (DC/DC) converter (LDC) ECU configured to adjust a battery SOC by charging and discharging of a battery with the FATC associated with an LDC.

14. The vehicle of claim 13, wherein the controller is connected to a spatial division map, and the spatial division map includes an open space stop control table connected to the open space stop control and a closed space stop control table connected to the closed space stop control.

15. The vehicle of claim 13, wherein the controller is configured to determine the division of the closed space and the open space according to whether to receive a global positioning system (GPS) signal.

16. The vehicle of claim 13, wherein the controller is configured to determine entry and advance to the closes space using map information displayed on a navigation system.

* * * * *